(12) United States Patent
Hsieh

(10) Patent No.: US 11,737,565 B2
(45) Date of Patent: Aug. 29, 2023

(54) QUICKLY INSTALLED HEADREST ADJUSTMENT DEVICE

(71) Applicant: Wen-Ping Hsieh, Taichung (TW)

(72) Inventor: Wen-Ping Hsieh, Taichung (TW)

( * ) Notice: Subject to any disclaimer, the term of this patent is extended or adjusted under 35 U.S.C. 154(b) by 468 days.

(21) Appl. No.: 17/043,661

(22) PCT Filed: Dec. 31, 2019

(86) PCT No.: PCT/CN2019/130458
§ 371 (c)(1),
(2) Date: Sep. 30, 2020

(87) PCT Pub. No.: WO2021/134457
PCT Pub. Date: Jul. 8, 2021

(65) Prior Publication Data
US 2023/0137499 A1 May 4, 2023

(51) Int. Cl.
*A47C 7/38* (2006.01)
*B60N 2/812* (2018.01)
*B60N 2/806* (2018.01)
*B60N 2/809* (2018.01)

(52) U.S. Cl.
CPC ............... *A47C 7/38* (2013.01); *B60N 2/806* (2018.02); *B60N 2/809* (2018.02); *B60N 2/812* (2018.02)

(58) Field of Classification Search
CPC ........ B60N 2/806; B60N 2/809; B60N 2/812; B60N 2/815; B60N 2/818; B60N 2/821; B60N 2/824; B60N 2/826; B60N 2/829; B60N 2/832; B60N 2/835; A47C 7/38
See application file for complete search history.

(56) References Cited

U.S. PATENT DOCUMENTS

2020/0146452 A1* 5/2020 Chen ..................... A47C 7/38

* cited by examiner

*Primary Examiner* — Syed A Islam

(57) ABSTRACT

A quickly installed headrest adjustment device includes a mount case connected to the chair back and includes a recessed area, an engaging hole, a latch and a first contact face on the rear side of the chair back. The engaging hole is located between the two side slots and defined through the inner bottom of the recessed area. The latch is connected to the inner top side of the engaging hole and includes a bottom face which protrudes beyond the engaging hole and faces the inner side of the recessed area. An adjustment device is mounted to the rail and includes a second contact face facing the first contact face, two ridges, and a block. The block is located between the two ridges. The users can connect the adjustment device to the mount case of the chair back to quickly install the headrest unit to the chair back.

9 Claims, 14 Drawing Sheets

QUICKLY INSTALLED HEADREST ADJUSTMENT DEVICE

BACKGROUND OF THE INVENTION

1. Fields of the Invention

The present invention relates to a chair, and more particularly, to a headrest adjustment device that can be quickly installed.

2. Descriptions of Related Art

Office chairs are developed competitively with new designs introduced to different types of office chairs. For high quality and high value office chairs, the manufacturers focus on the adjustment features regarding different parts of the office chairs, such as the angle adjustment of the headrest so as to provide the users to feel relaxation and get relief to muscles after a long time of office work, by resting the head and neck to the headrest.

However, the connection between the headrest and the chair back of the existing office chairs mostly rely on use of bolts, such as Taiwanese Patent Publication No. 1358999 which discloses a "general-use headrest assembly", and Taiwanese Utility Model Publication No. M399658 which discloses a "securing device for headrest of office chair". The users have to user rotatable tools to assemble and install the headrest to the chair after opening the box of the office chair. This is not convenient for the users.

The present invention intends to provide a headrest that is able to be installed quickly without use of tools.

SUMMARY OF THE INVENTION

The primary object of the present invention is to provide a mount case on a chair back, and the mount case includes a recessed area. The users can connect the adjustment device of the rail to the mount case of the chair back after opening the pack box and to quickly and conveniently install the headrest unit to the chair back.

The present invention relates to a quickly installed headrest adjustment device and comprises a mount case that is connected to a chair back and includes a recessed area, an engaging hole, a latch and a first contact face which is located on the rear side of the chair back. The recessed area is defined in the first contact face and including, an inner bottom, two side slots and an inner side which extends from the lower end of the inner bottom of the recessed area. The engaging hole is located between the two side slots and defined through the inner-bottom of the recessed area. The latch is connected to the inner top side of the engaging hole and includes a bottom face which protrudes beyond the engaging hole and faces the inner side of the recessed area. A headrest unit includes a rail and a headrest that is connected to one end of the rail. The rail includes a groove, and a first gear rack is located on one side of the groove. The first gear rack includes multiple first teeth spaced apart from each other. An adjustment device is mounted to the rail and includes a second contact face, two ridges, a block, a first space, a stepped recess and a button. The second contact face faces the first contact face. The two ridges protrude beyond the second contact face and are connected to the first contact face. Each ridge has multiple tongues that faces the side slot corresponding thereto. The block is located between the two ridges. The multiple tongues of each of the ridges are inserted into the side slot corresponding thereto so that the ridges are located in the recessed area and contact the inner side of the recessed area. The latch is pushed by the block, and the bottom face of the latch contacts the block. The first space faces the rail. The stepped recess is defined in one side of the first space and includes a stop face and a pivot. The button is pivotably connected to the pivot and includes a resilient tab and multiple engaging teeth which are located on the lower section of the button and lace the first gear rack. The resilient tab extends from the upper section of the button and resiliently contacts the stop face. The button is pivoted by the resilient tab to engage the engaging teeth of the button with the first teeth of the first gear rack to restrict the rail from being lowered. The rail adjustably moves upward when the first teeth of the first gear rack push upward and are separated from the engaging teeth. The button is pushed and pivoted in an opposite direction to disengage the engaging teeth of the button from the first gear rack of the rail so that the rail is movable down along the adjustment device.

As one embodiment of the present invention, the latch includes an inclined face that faces the first contact face and is formed with the bottom face. The inclined face is configured to provide a buffering feature when the block is moved to push and deform the latch to enter into the engaging hole.

As one embodiment of the present invention, the mount case includes multiple through holes which are defined through the inner bottom of the recessed area so as to be connected to the chair back. Each through hole includes a circular recess that is formed in the inner bottom of the recessed area so as to accommodate heads of screws such that the heads of the screws do not protrude beyond the inner bottom of the recessed area.

As one embodiment of the present invention, the adjustment device includes a notch which accommodates the latch when the latch is deformed to release the block 4.

As one embodiment of the present invention, the button is an inverted L-shaped button and includes a path which is located at the upper section of the button. The pivot is pivotably engaged with the path.

As one embodiment of the present invention, the present invention further includes a cover that includes a second space, and the rail is located between the second space of the cover and the first space of the adjustment device.

As one embodiment of the present invention, the groove of the rail includes a second gear rack which is located corresponding to the first gear rack. Two guide plates are axially located between the first gear rack and the second gear rack. The first space includes an inner bottom. A lug extends from the inner bottom of the first space and is inserted into the groove of the rail and engaged between the two guide plates so as to guide the rail along the adjustment device.

As one embodiment of the present invention, a buffering unit is inserted in the groove of the rail and located between the first gear rack and the second gear rack. The buffering unit includes a damp member and a gear. The damp member is fixed to the inner bottom of the first space. The gear is pivotably connected between the damp member and the second gear rack. The gear is engaged with the second gear rack and contacts the damp member so that when the second gear rack of the rail moves up and down to rotate the gear, the gear contacts the damp member to buffer movement of the second gear rack of the rail.

As one embodiment of the present invention, the first space includes two hooks to which the damp member is mounted, and a rod to which the gear is pivotably mounted. The two hooks and the rod are formed to the inner bottom of the first space.

As one embodiment of the present invention, the headrest unit includes a guide member which is pivotably connected to the headrest. The rail includes a reception recess defined in the top thereof. A bolt is radially connected to the reception recess. The guide member includes a lateral recess, an insertion facing the reception recess, a protrusion and a spring. The protrusion protrudes from the insertion and the spring is mounted to the protrusion. The reception recess receives the guide member. The spring is biased between the insertion and the inner end of the reception recess to resiliently move the headrest along the reception recess. The bolt protrudes into the lateral recess to prevent the guide member from disengaging from the lateral recess.

Figure 1:
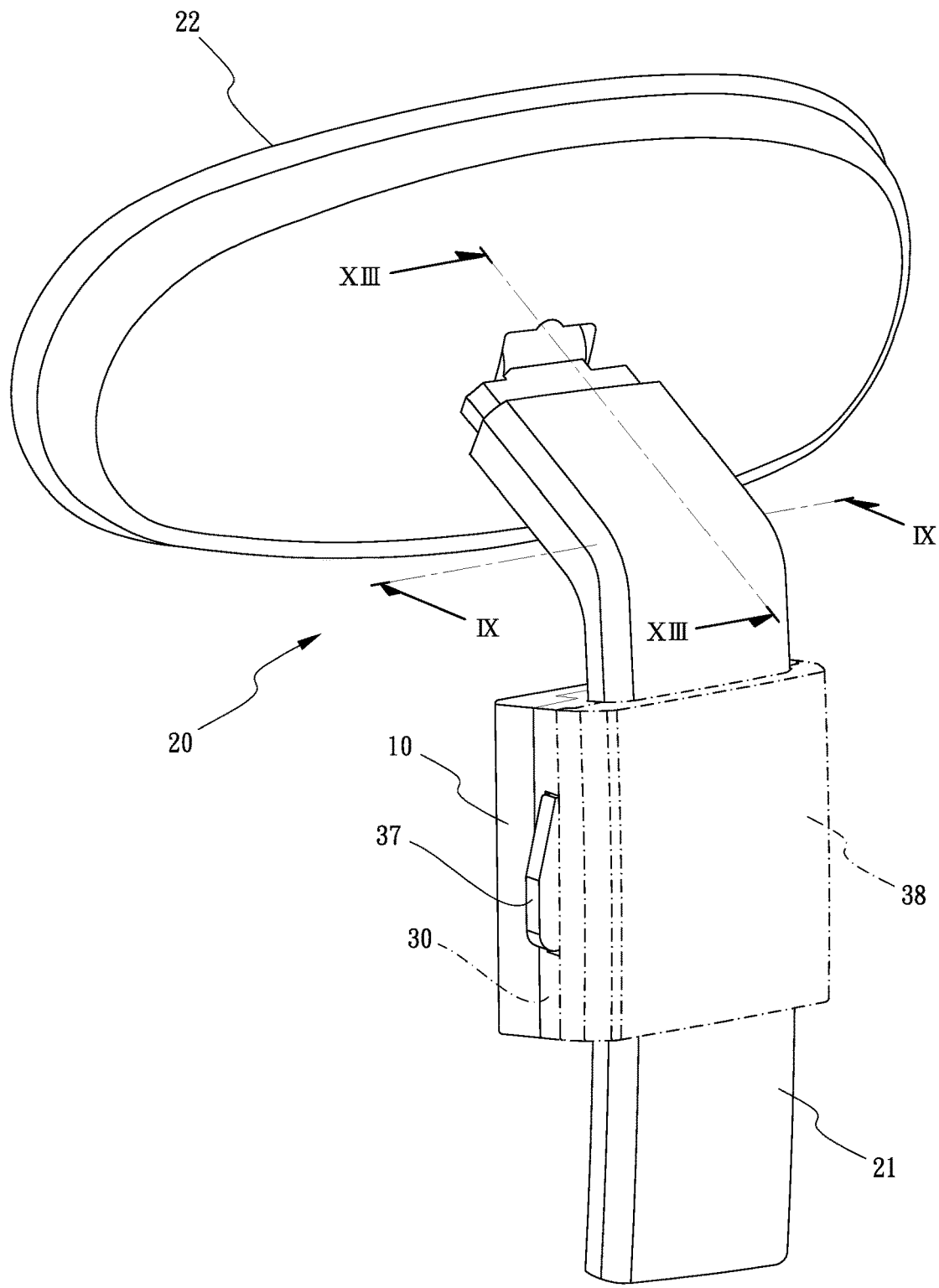
FIG. 1 is a perspective view of the present invention.
Figure 1A:
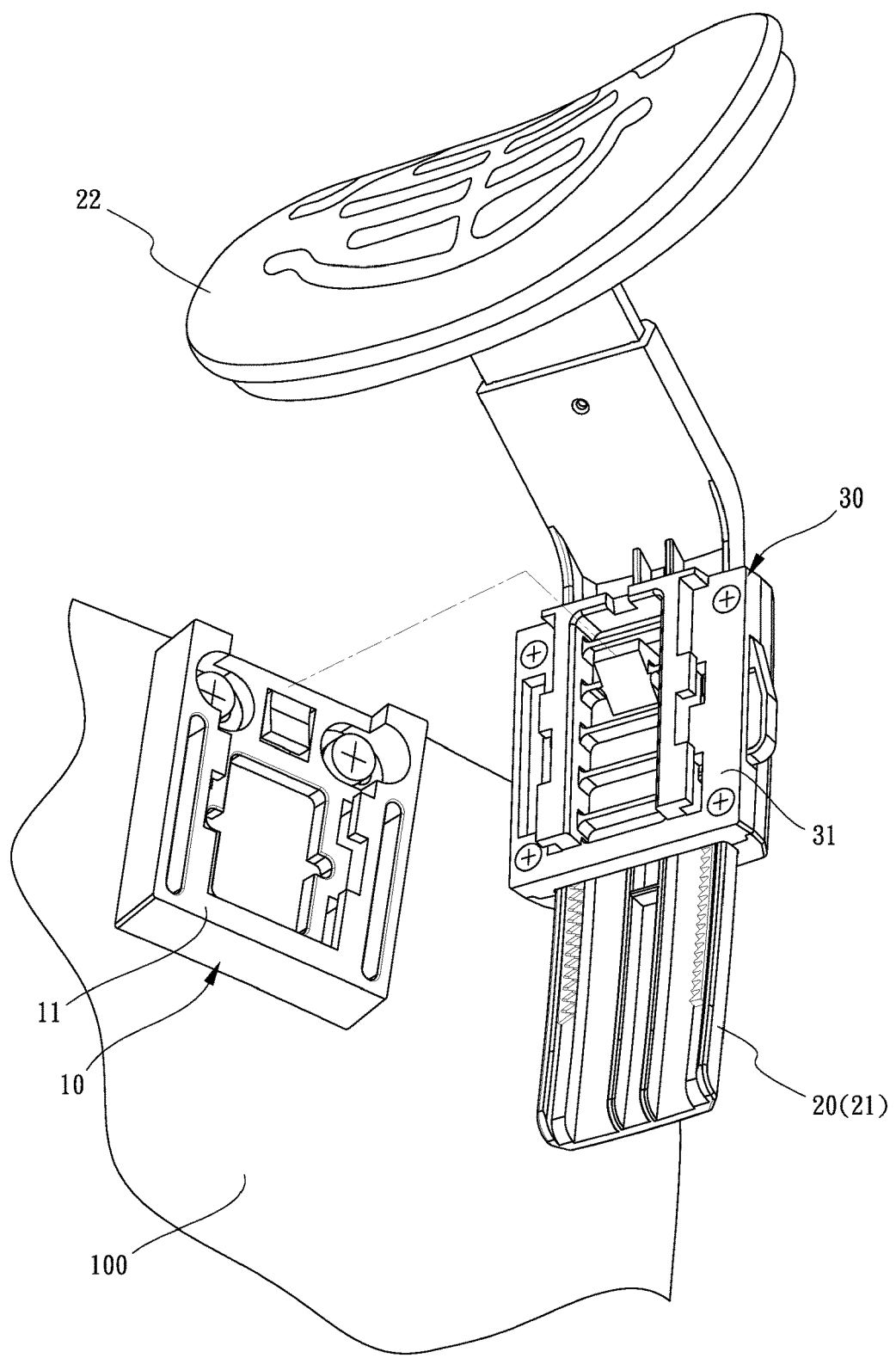
FIG. 1A is an exploded view of the present invention.
Figure 2:
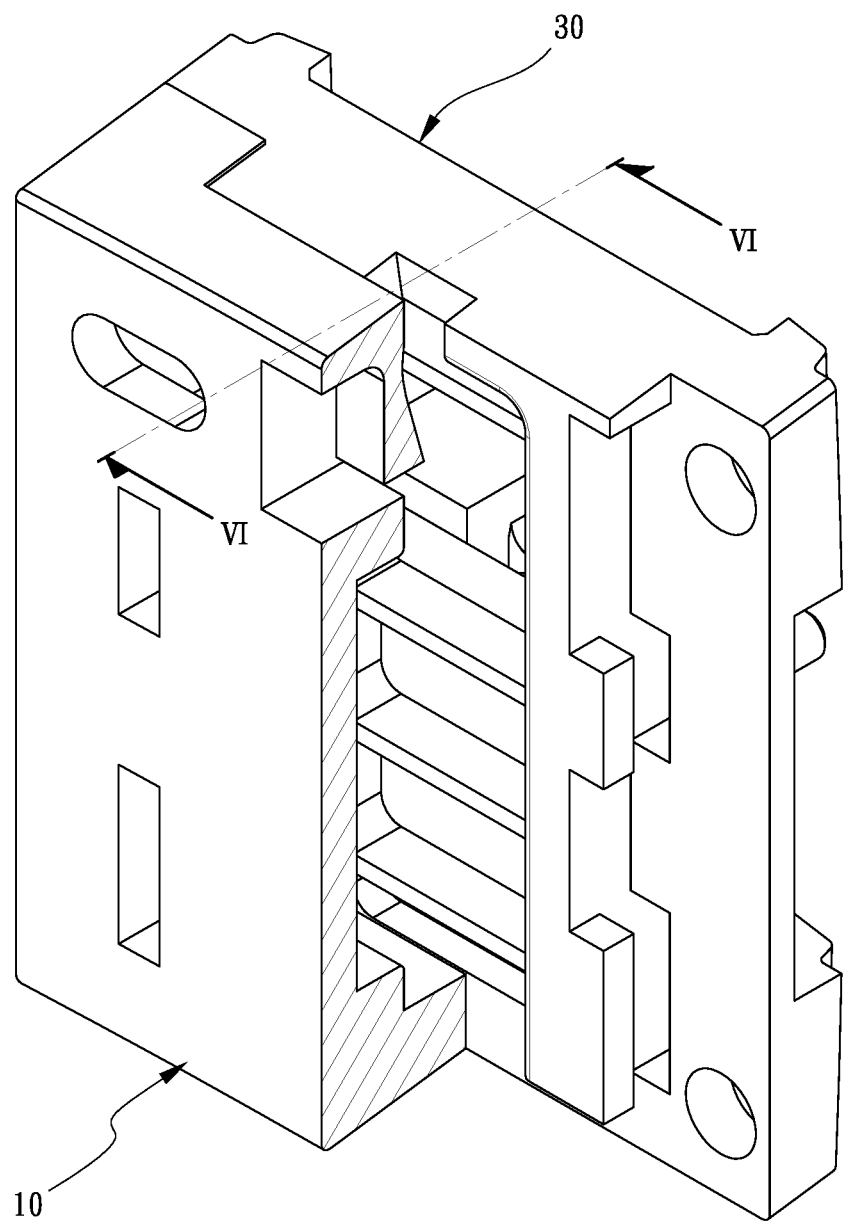
FIG. 2 is a perspective view of the mount case and the adjustment device of the present invention.
Figure 3:
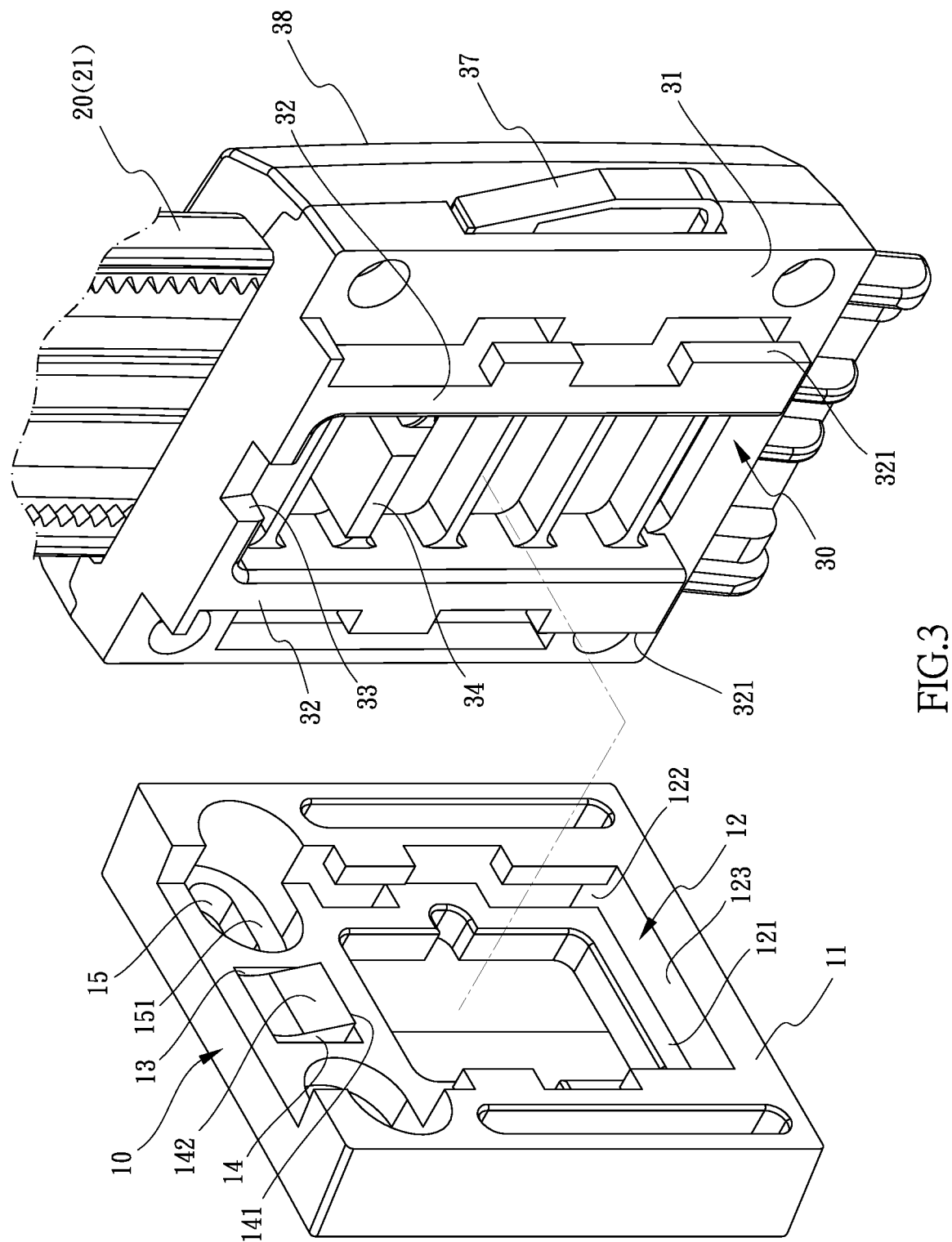
FIG. 3 is an exploded view of the mount case and the adjustment device of the present invention.

SYMBOL DESCRIPTION OF MAIN COMPONENTS chair back 100; mount case 10; first contact face 11; recessed area 12; inner bottom 121; side slot 122; inner side 123; engaging hole 13; latch 14; bottom face 141; inclined face 142; through hole 15; circular recess 151; headrest unit 20; rail 21; groove 211; first gear rack 2111; second gear rack 2112; reception recess 212; bolt 213; headrest 22; guide member 23; lateral recess 231; insertion 232; protrusion 233; spring 234; adjustment device 30; second contact face 31; ridge 32; tongue 321; notch 33; block 34; first space 35; inner bottom 351; lug 352; stepped recess 36; stop face 361; pivot 362; button 37; resilient tab 371; engaging teeth 372; path 373; cover 38; second space 381; buffering unit 39; damp member 391; gear 392

DETAILED DESCRIPTION OF THE PREFERRED EMBODIMENT

Referring to the drawings wherein the same numeral represents the same component. The description hereinafter is based on embodiments of the present application and are not restricted thereto.

Referring to FIGS. 1 to 12, the quickly installed headrest adjustment device of the present invention comprises a mount case which is connected to a chair back 100 and includes a recessed area 12, an engaging hole 13, a latch 14 and a first contact face 11 which is located on the rear side of the chair back 100. The recessed area 12 is defined in the first contact face 11 and includes an inner bottom 121, two side slots 122 and an inner side 123 which extends from the lower end of the inner bottom 121 of the recessed area 12. The engaging hole 13 is located between the two side slots 122 and defined through the inner bottom of the recessed area. The latch 14 is connected to the inner top side of the engaging hole 13 and includes a bottom face 141 which protrudes beyond the engaging hole 13 and faces the inner side 123 of the recessed area 12.

A headrest unit 20 includes a rail 21 and a headrest 22 that is connected to one end of the mil 21. The rail 21 includes a groove 211, and a first gear rack 2111 is located on one side of the groove 211. The first gear rack 2111 includes multiple first teeth spaced apart from each other.

An adjustment device 30 is mounted to the rail 21 and includes a second contact face 31, two ridges 32, a block 34, a first space 35, a stepped recess 36 and a button 37. The second contact face 31 faces the first contact face 11. The two ridges 32 protrude beyond the second contact face 31 and are connected to the first contact face 11. Each ridge 32 has multiple tongues 321 that faces the side slot 122 corresponding thereto. The block 34 is located between the two ridges 32. The multiple tongues 321 of each of the ridges 32 are inserted into the side slot 122 corresponding thereto so that the ridges 32 are located in the recessed area 12 and contact the inner side 123 of the recessed area 12. The latch 14 is pushed by the block 34, and the bottom face 141 of the latch 14 contacts the block 34. The first space 35 faces the rail 21. The stepped recess 36 is defined in one side of the first space 35 and includes a stop face 361 and a pivot 362. The button 37 is pivotably connected to the pivot 362 and includes a resilient tab 371 and multiple engaging teeth 372 which are located on the lower section of the button 37 and face the first gear rack 2111. The resilient tab 371 extends from the upper section of the button 37 and resiliently contacts the stop face 361. The button 37 is pivoted by the resilient tab 371 to engage the engaging teeth 372 of the button 37 with the first teeth of the first gear rack 2111 to restrict the rail 21 from being lowered. The rail 21 adjustably moves upward when the first teeth of the first gear rack 2111 push upward and are separated from the engaging teeth 372. The button 37 is pushed and pivoted in an opposite direction to disengage the engaging teeth 372 of the button 37 from the first gear rack 2111 of the rail 21 so that the rail 21 is movable down along the adjustment device 30.

Figure 4:
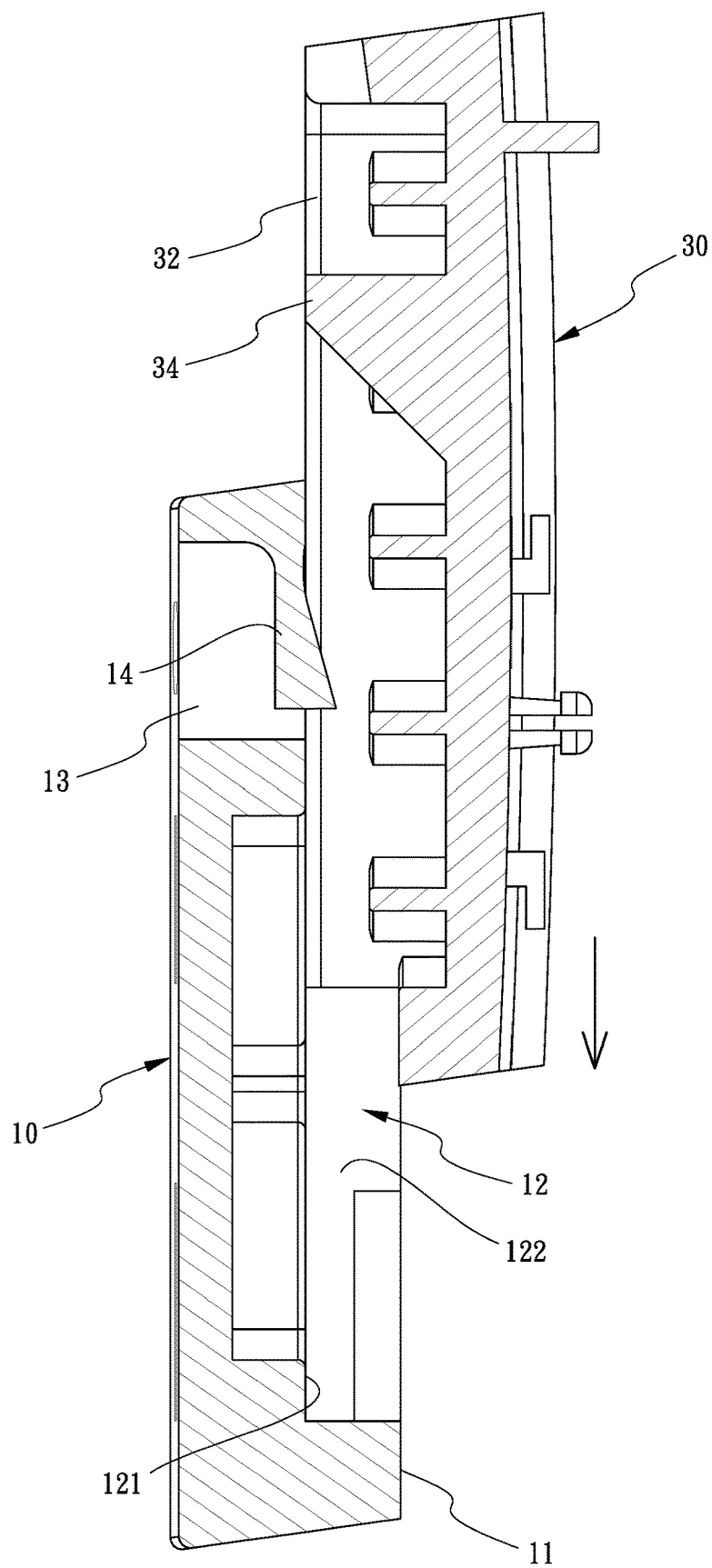
FIG. 4 is a side cross sectional view to show the connection of the mount case and the adjustment device of the present invention.
Figure 5:
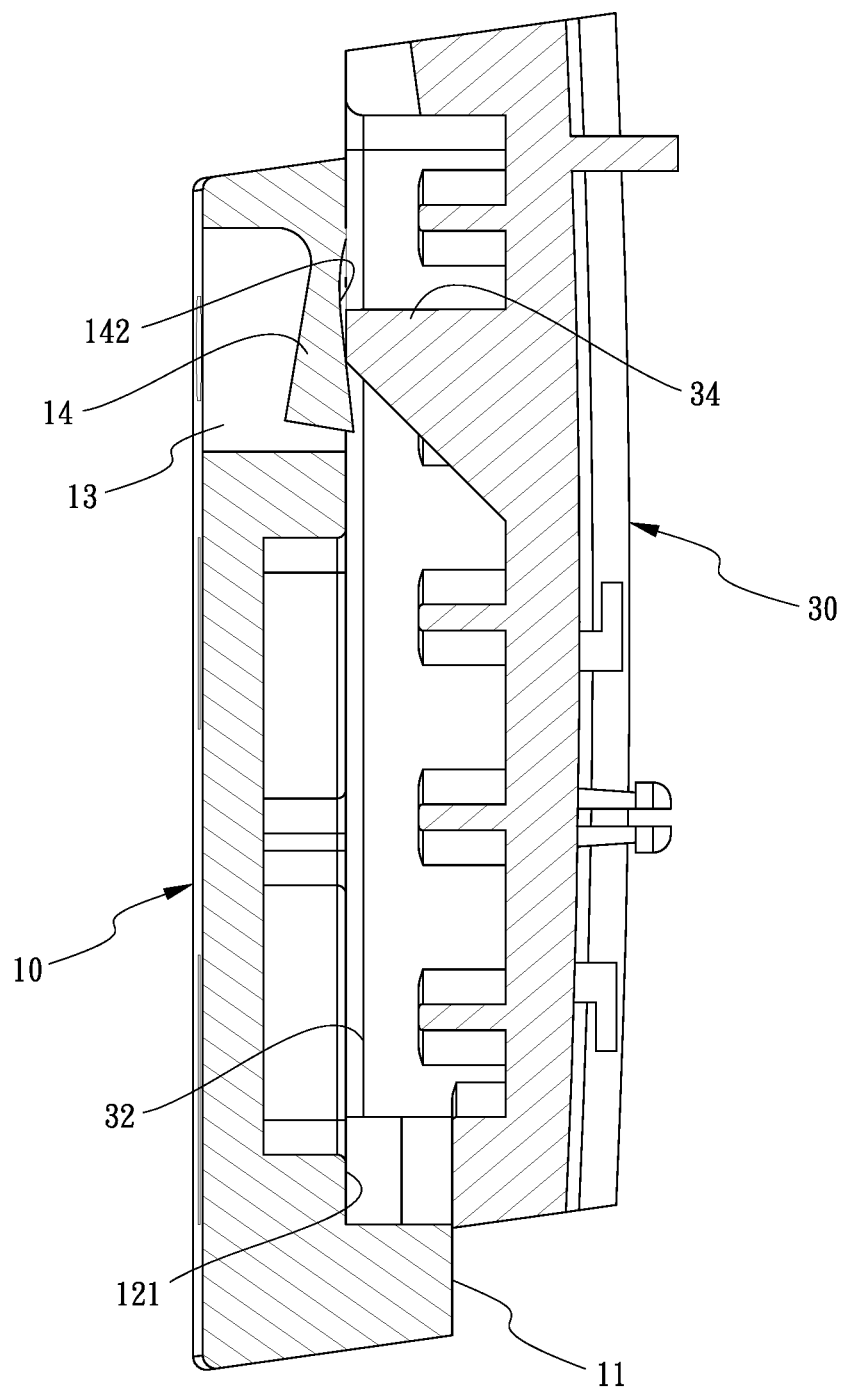
FIG. 5 shows that the inclined face disclosed in FIG. 4 guides the block to push and deform the latch.
Figure 6:
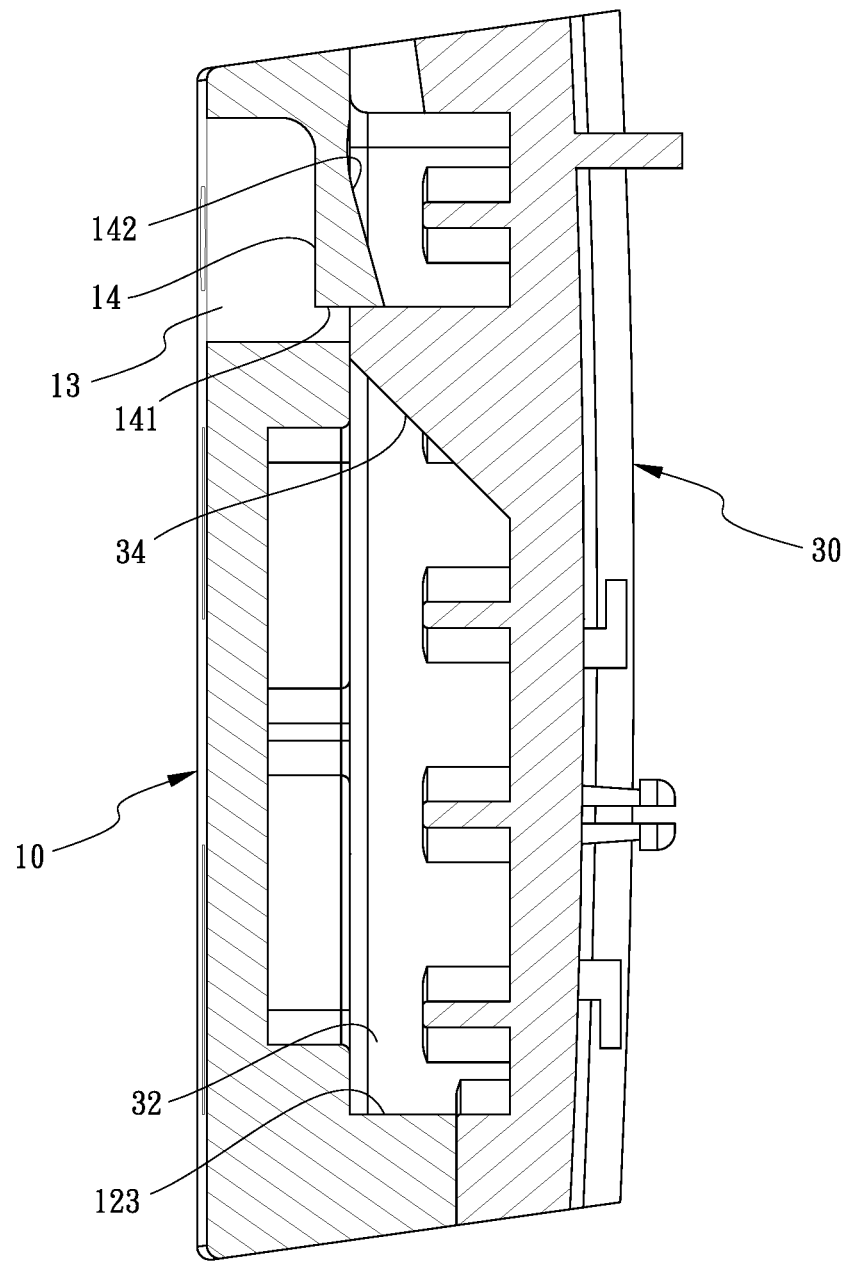
FIG. 6 is a cross sectional view, taken along line VI-VI in FIG. 2.

As shown in FIGS. 2 to 6, by the mount case 10 on the chair back 100 that includes the recessed area 12 and the latch 14. The recessed area 12 includes inner bottom 121 and the two side slots 122. The latch 14 includes the bottom face 141. As shown in FIG. 4, the adjustment device 30 on the rail 21 includes the block 34 and the two ridges 32. The two ridges 32 are inserted into the recessed area 12 and move along the direction shown by the arrow head. As shown in FIG. 5, the block 34 pushes and deforms the latch 14 which is pivoted so that the adjustment device 30 contacts the inner side 123 and is positioned. The latch 14 is pushed by the block and resiliently moves back, and the bottom face 141 contacts the block 34, so that the latch 14 is positioned so as to restrict the adjustment device 30 from being disengaged. After the users open the pack box, the rail 21 is installed by slidably connecting the adjustment device 30 to the recessed area 12 of the mount case 10 to quickly complete the installation as shown in FIG. 6.

As shown in FIGS. 1 to 12, the latch 14 includes an inclined face 142 that faces the first contact face 11 and is formed with the bottom face 141. The inclined face 142 is configured to provide a buffering feature when the block 34 is moved to push and deform the latch 14 to enter into the engaging hole 13. In addition, the mount case 10 includes multiple through holes 15 which are defined through the inner bottom 121 of the recessed area 12 so as to be connected to the chair back 100. Each through hole 15 includes a circular recess 151 that is formed in the inner bottom 121 of the recessed area 12 so as to accommodate heads of screws such that the heads of the screws do not protrude beyond the inner bottom 121 of the recessed area 12 to case interference.

Figure 7:
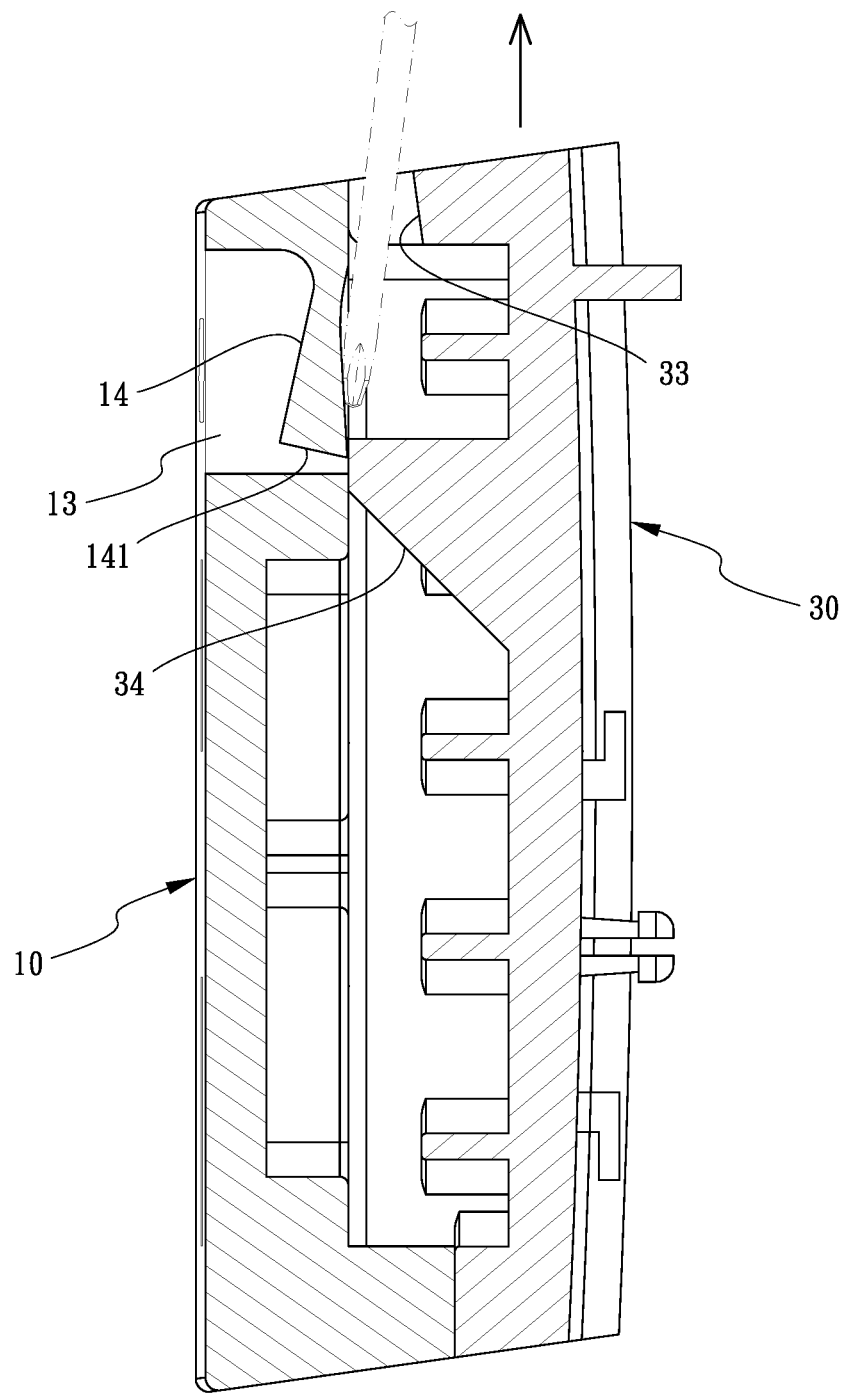
FIG. 7 is a cross sectional view to show that the latch in FIG. 6 is pushed to release the block.
Figure 8:
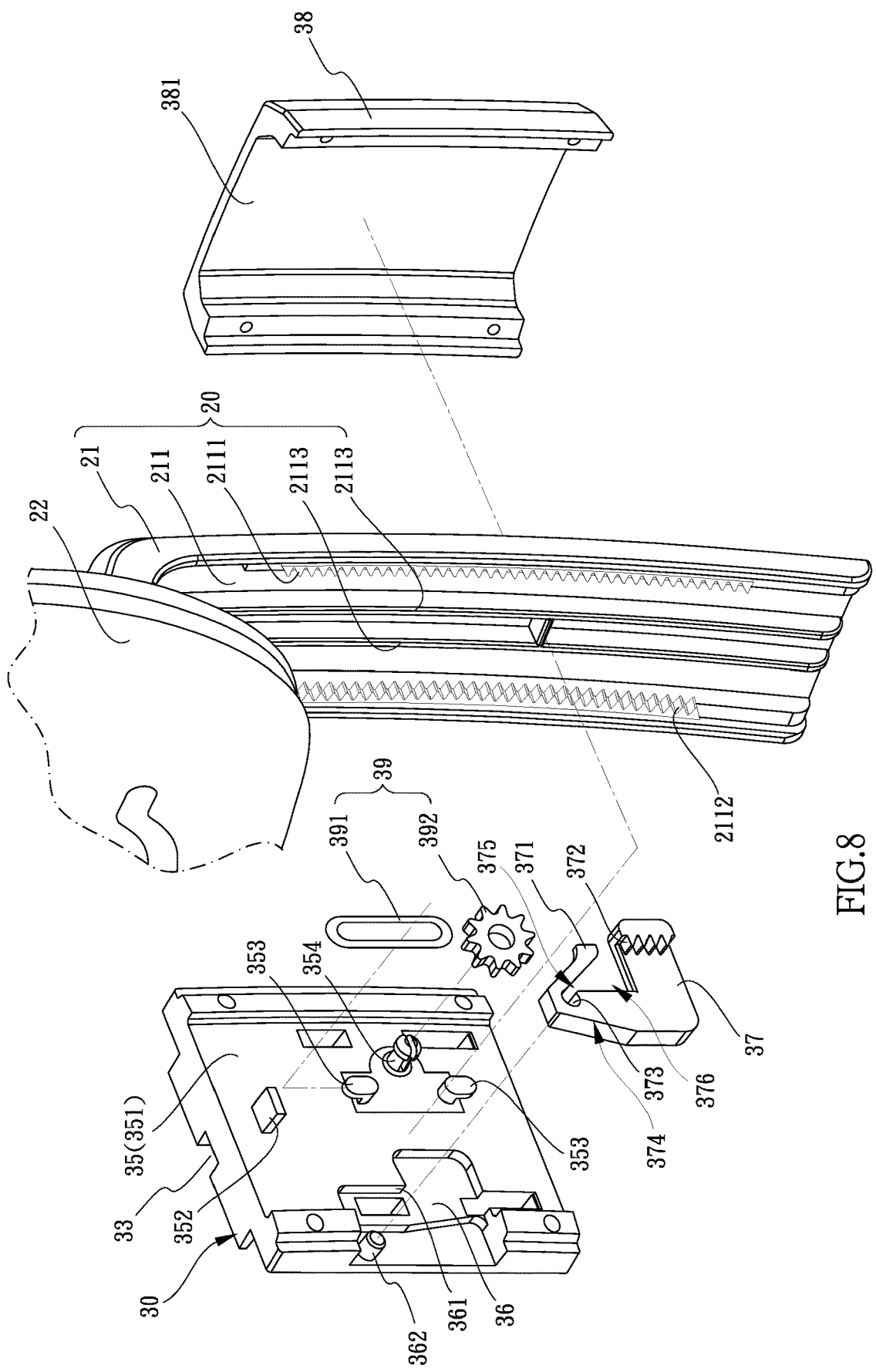
FIG. 8 is an exploded view of the headrest unit and the adjustment device of the present invention.
Figure 9:
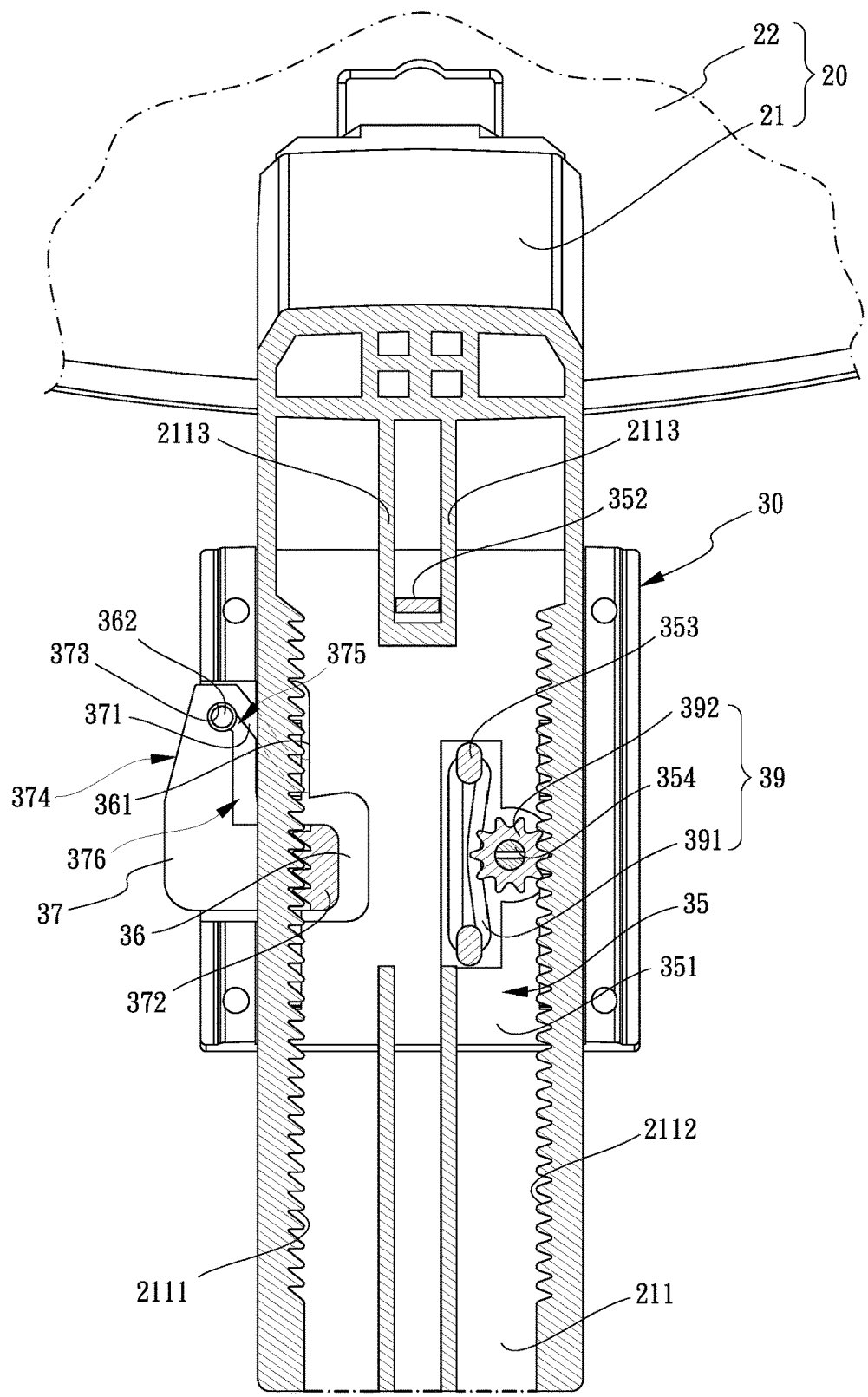
FIG. 9 is a cross sectional view taken along line IX-IX in FIG. 1.
Figure 10:
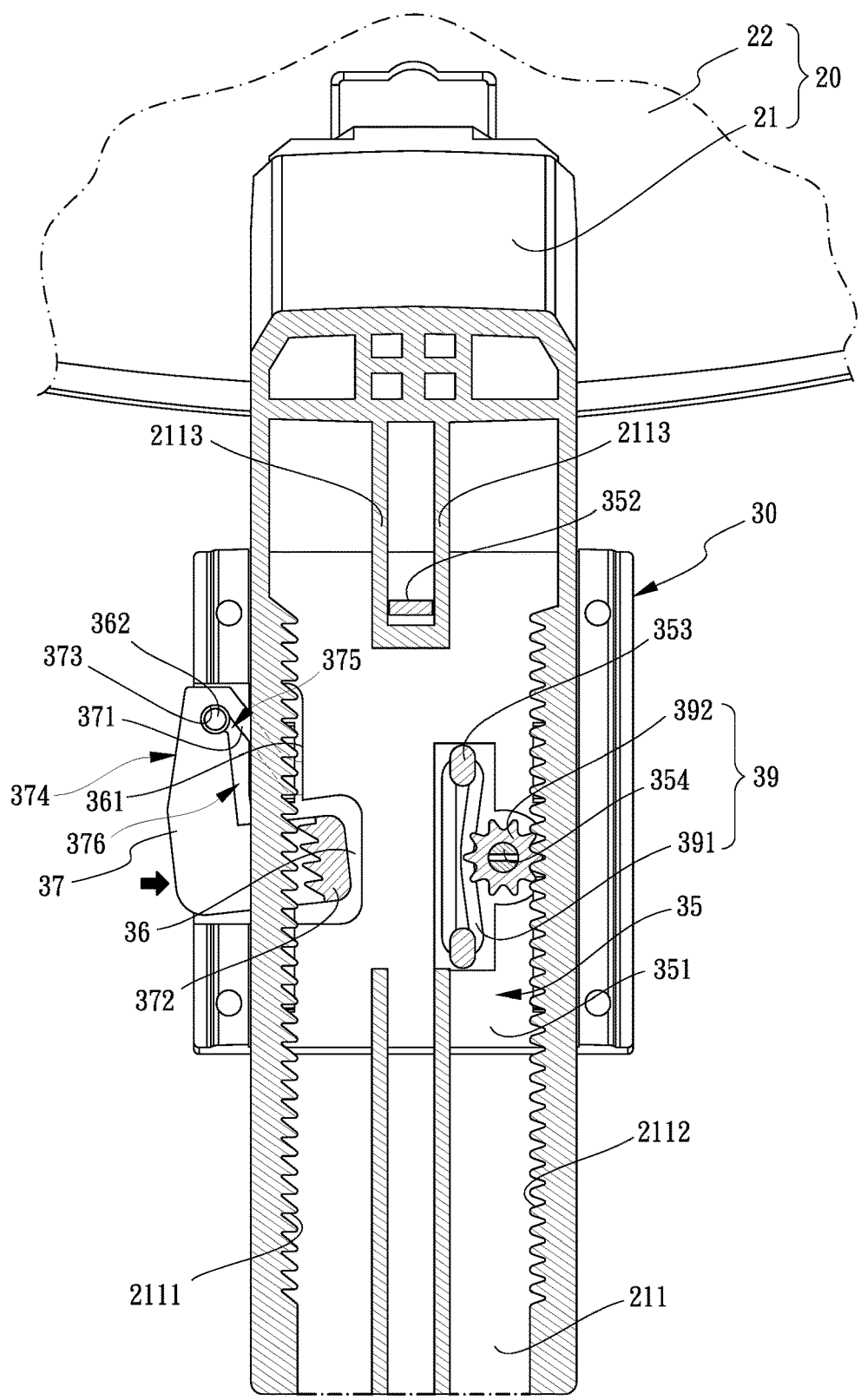
FIG. 10 is a cross sectional view to show that the engaging teeth of the button in FIG. 9 are disengaged from the first gear rack of the rail.
Figure 11:
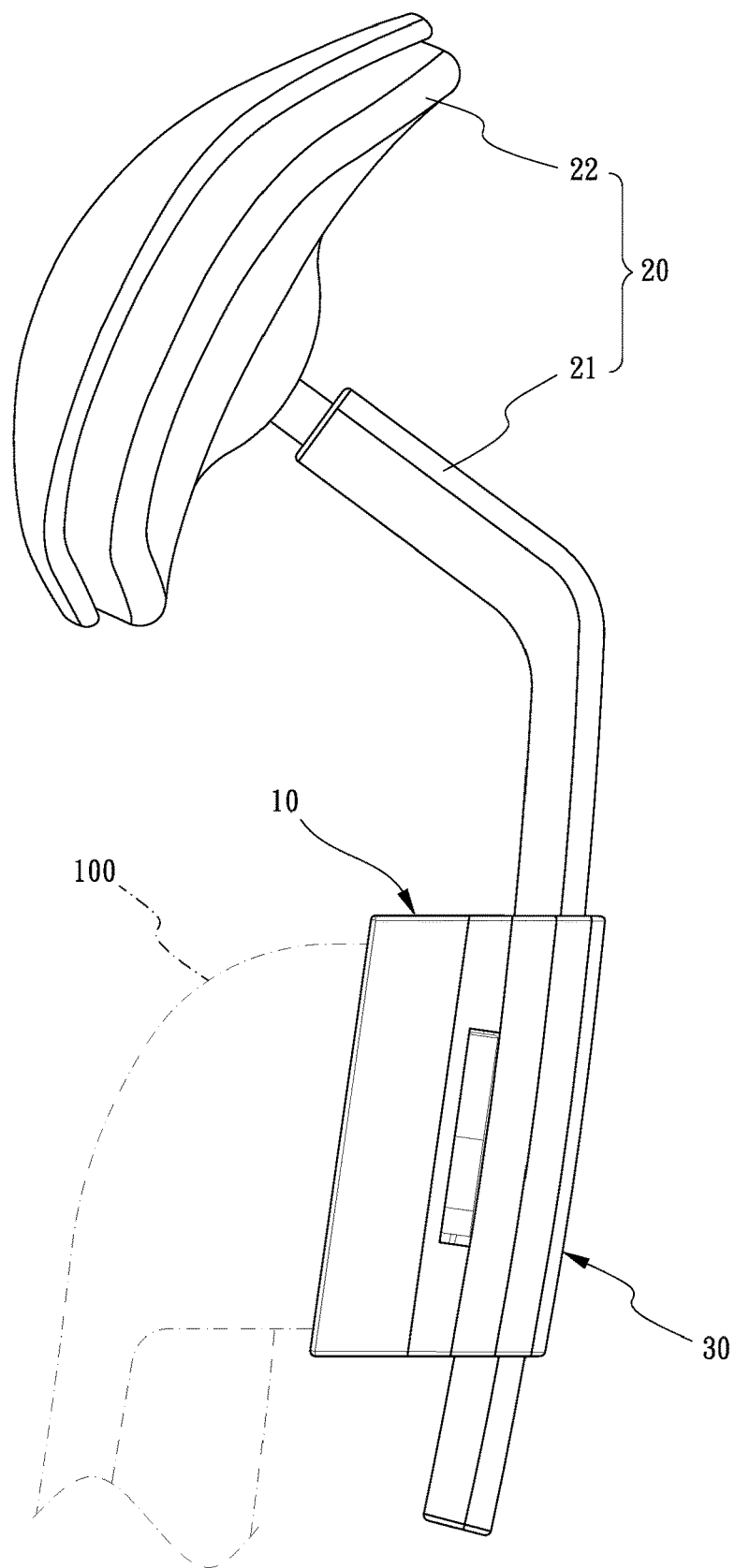
FIG. 11 shows that the first gear rack of the rail is released so as to make an upward adjustment.
Figure 12:
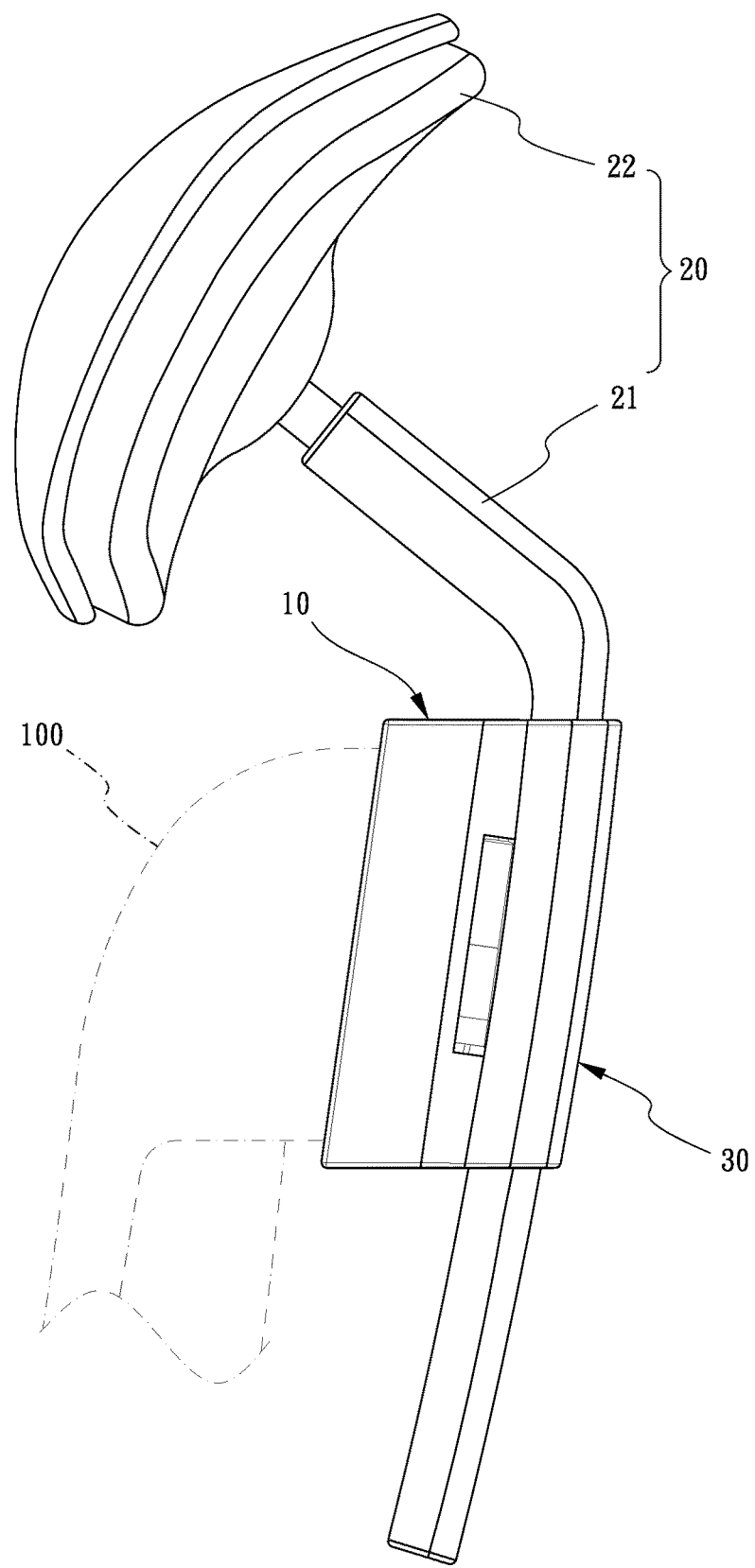
FIG. 12 shows that the first gear rack of the rail is released so as to snake a downward adjustment.

As shown in FIG. 7, the adjustment device 30 includes a notch 33 which accommodates the latch 14 when the latch 14 is deformed to release the block 34. Therefore, the headrest unit 20 can be released from the chair back 100.

The button 37 is an inverted L-shaped button and includes a path 373 which is located at the upper section of the button 37. The pivot 362 is pivotably engaged with the path 373. The quickly installed headrest adjustment device of the present application further comprising a cover 38 which includes a second space 381. The rail 21 is located between the second space 381 of the cover 38 and the first space 35 of the adjustment device 30. The groove 21 of the rail 21 includes a second gear rack 2112 which is located corresponding to the first gear rack 2111. Two guide plates 2113 are axially located between the first gear rack 2111 and the second gear rack 2112. The first space 35 includes an inner bottom 351. A lug 352 extends from the inner bottom 351 of the first space 35 and is inserted into the groove 211 of the rail 21. The lug 352 is engaged between the two guide plates 2113 so as to guide the rail 21 along the adjustment device 30 stably. As an embodiment, the present application further includes a buffering unit 39 which is inserted in the groove 211 of the rail 21 and located between the first gear rack 2111 and the second gear rack 2112. The buffering unit 39 includes a damp member 391 and a gear 392. The damp member 391 is fixed to the inner bottom 351 of the first space 35. The gear 392 is pivotably connected between the damp member 391 and the second gear rack 2112. The gear 392 is engaged with the second gear rack 2112 and contacts the damp member 391 so that when the second gear rack 2112 of the rail 21 moves up and down to rotate the gear 392. The gear 392 contacts the damp member 391 to create friction to buffer movement of the second gear rack 2112 of the rail 21. Besides. the first space 35 includes two hooks 353 to which the damp member 391 is mounted, and a rod 354 to which the gear 392 is pivotably mounted. The two hooks 353 and the rod 354 are formed to the inner bottom 351 of the first space 35.

Figure 13:
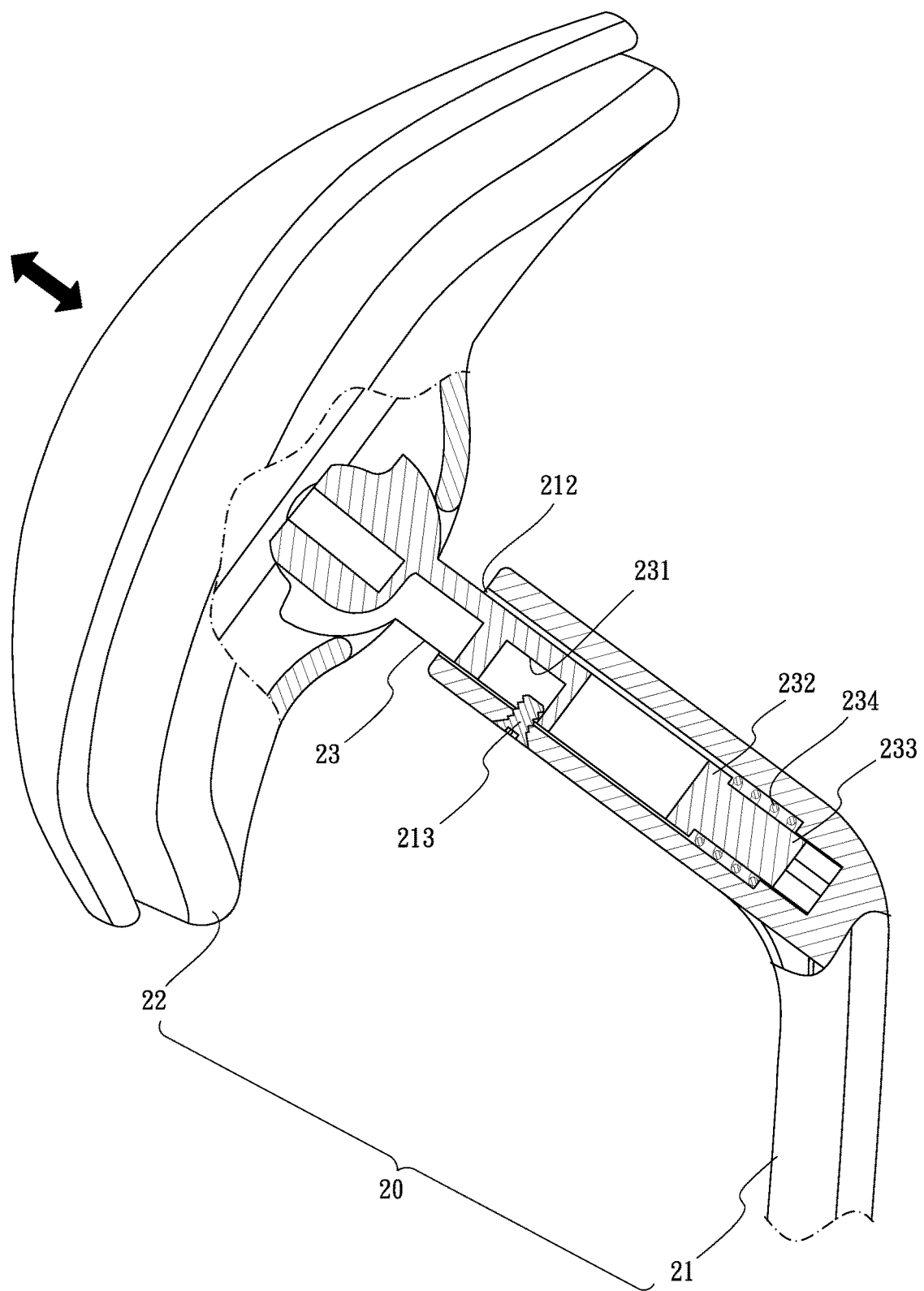
FIG. 13 is a cross sectional view taken along line XIII-XIII in FIG. 1.

As shown in FIG. 13, the headrest unit 20 includes a guide member 23 which is pivotably connected to the headrest 22. The rail 21 includes a reception recess 212 defined in the top thereof. A bolt 213 is radially connected to the reception recess 212. The guide member 23 includes a lateral recess 231, an insertion 232 facing the reception recess 212, a protrusion 233 and a spring 234. The protrusion 233 protrudes from the insertion 232 and the spring 234 is mounted to the protrusion 232. The reception recess 212 receives the guide member 23. The spring 234 is biased between the insertion 232 and the inner end of the reception recess 212 to resiliently move the headrest 22 along the reception recess 212. The bolt 213 protrudes into the lateral recess 231 to prevent the guide member 23 from disengaging from the lateral recess 231.

INDUSTRIAL APPLICABILITY

The quickly installed headrest adjustment device of the present application includes a mount case on the chair back, and the mount case includes a recessed area with restriction structure and which allows the users to quickly install the rail to a chair back by connecting the adjustment device to the recessed area of the mount case after the users open the pack box. The present application is convenient and can be manufactured and used in industries.

What is claimed is:

1. A quickly installed headrest adjustment device comprising:
   a mount case connected to a chair back and including a recessed area, an engaging hole, a latch and a first contact face which is located on a rear side of the chair back, the recessed area defined in the first contact face and including an inner bottom, two side slots and an inner side which extends from a lower end of the inner bottom of the recessed area, the engaging hole located between the two side slots and defined through the inner bottom of the recessed area, the latch connected to an inner top side of the engaging hole and including a bottom face which protrudes beyond the engaging hole and faces the inner side of the recessed area;
   a headrest unit including a rail and a headrest that is connected to one end of the rail, the rail including a groove, a first gear rack located on a side of the groove, the first gear rack including multiple first teeth spaced apart from each other, and
   an adjustment device mounted to the rail and including a second contact face, two ridges, a block, a first space, a stepped recess and a button, the second contact face facing the first contact face, the two ridges protruding beyond the second contact face and connected to the first contact face, each ridge having multiple tongues that faces the side slot corresponding thereto, the block located between the two ridges, the multiple tongues of each of the ridges inserted into the side slot corresponding thereto so that the ridges are located in the recessed area and contact the inner side of the recessed area, the latch being pushed by the block and the bottom face of the latch contacting the block, the first space facing the rail, the stepped recess defined in one side of the first space and including a stop face and a pivot, the button including a base part 374, a resilient tab extending from a top end of the base part 374 to form a path 373 between the resilient tab 371 and the base part 374, the resilient tab 371 and the base part 374 forming an inverted V-shaped arrangement, an operational space 376 formed between the base part 374 and the resilient tab 371, the path 373 communicating with the space 376 via an opening 375, multiple engaging teeth located on a lower section of the button and facing the first gear rack, the button pivotably connected to the pivot, and the pivot pivotably engaged with the path, the resilient tab resiliently contacting the stop face, the button being pivoted by the resilient tab to engage the engaging teeth of the button with the first teeth of the first gear rack to restrict the rail from being lowered, the rail adjustably moves upward when the first teeth of the first gear rack push upward and are separated from the engaging teeth, the button being pushed and pivoted in an opposite direction to disengage the engaging teeth of the button from the first gear rack of the rail so that the rail is movable down along the adjustment device.

2. The quickly installed headrest adjustment device as claimed in claim 1, wherein the latch includes an inclined face that faces the first contact face and is formed with the bottom face, the inclined face is configured to provide a buffering feature when the block is moved to push and deform the latch to enter into the engaging hole.

3. The quickly installed headrest adjustment device as claimed in claim 1, wherein the mount case includes multiple through holes which are defined through the inner bottom of the recessed area so as to be connected to the chair back, each through hole includes a circular recess that is formed in the inner bottom of the recessed area so as to accommodate heads of screws such that the heads of the screws do not protrude beyond the inner bottom of the recessed area.

4. The quickly installed headrest adjustment device as claimed in claim 1, wherein the adjustment device includes a notch which accommodates the latch when the latch is deformed to release the block.

5. The quickly installed headrest adjustment device as claimed in claim 1 further comprising a cover which includes a second space, the rail is located between the second space of the cover and the first space of the adjustment device.

6. The quickly installed headrest adjustment device as claimed in claim 1, wherein the groove of the rail includes a second gear rack which is located corresponding to the first gear rack, two guide plates are axially located between the first gear rack and the second gear rack, the first space includes an inner bottom, a lug extends from the inner bottom of the first space and is inserted into the groove of the rail and engaged between the two guide plates so as to guide the rail along the adjustment device.

7. The quickly installed headrest adjustment device as claimed in claim 6, wherein a buffering unit is inserted in the groove of the rail and located between the first gear rack and the second gear rack, the buffering unit includes a damp member and a gear, the damp member is fixed to the inner bottom of the first space, the gear is pivotably connected between the damp member and the second gear rack, the gear is engaged with the second gear rack and contacts the damp member so that when the second gear rack of the rail moves up and down to rotate the gear, the gear contacts the damp member to buffer movement of the second gear rack of the rail.

8. The quickly installed headrest adjustment device as claimed in claim 7, wherein the first space includes two hooks to which the damp member is mounted, and a rod to which the gear is pivotably mounted, the two hooks and the rod are formed to the inner bottom of the first space.

9. The quickly installed headrest adjustment device as claimed in claim 6, wherein the headrest unit includes a guide member which is pivotably connected to the headrest, the rail includes a reception recess defined in a top thereof, a bolt is radially connected to the reception recess, the guide member includes a lateral recess, an insertion facing the reception recess, a protrusion and a spring, the protrusion protrudes from the insertion and the spring is mounted to the protrusion, the reception recess receives the guide member, the spring is biased between the insertion and an inner end of the reception recess to resiliently move the headrest along the reception recess, the bolt protrudes into the lateral recess to prevent the guide member from disengaging from the lateral recess.

* * * * *